United States Patent [19]
Greaves

[11] 3,724,389
[45] Apr. 3, 1973

[54] STORAGE FACILITY

[75] Inventor: Richard Johnson Greaves, Victoria, Australia

[73] Assignee: Brownbuilt Limited, Victoria, Australia

[22] Filed: Apr. 14, 1971

[21] Appl. No.: 134,020

[30] Foreign Application Priority Data

Apr. 14, 1970 Australia.........................PA 0897/70

[52] U.S. Cl..................104/162, 214/16 B, 312/199
[51] Int. Cl. ...........................................B61b 13/12
[58] Field of Search......214/16 B, 16.1 CC; 104/154, 104/162; 312/198-203

[56] References Cited

UNITED STATES PATENTS 3,080,204    3/1963    Lindhgren.....................214/16 B X
2,987,200    6/1961    Ingold..............................214/16 B
1,829,023    10/1931   Swartout.....................214/16.1 CC
2,924,343    2/1960    Isven...........................214/16.1 CC Primary Examiner—Robert G. Sheridan
Attorney—Sughrue, Rothwell, Mion, Zinn & Macpeak

[57] ABSTRACT

A mobile storage facility comprising a plurality of storage structures arranged successively along a track and each movable along the track, power means connected between an intermediate pair of said storage structures and operable to cause relative movement between them, and coupling means selectively to couple the two end storage structures to fixed anchorages and selectively to couple together each successive pair of said storage structures which is not both the intermediate structures.

5 Claims, 1 Drawing Figure

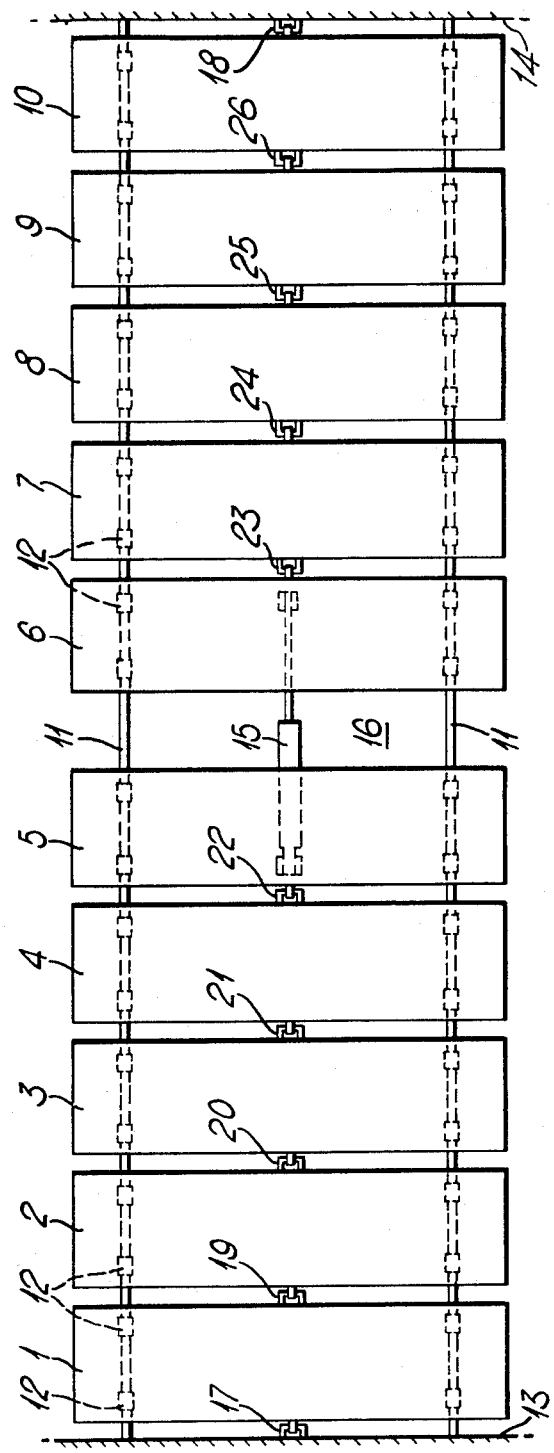

STORAGE FACILITY

BACKGROUND OF THE INVENTION

1. Field of the Invention

This invention relates to storage facilities and more particularly to facilities providing what is generally known as "mobile storage."

2. Description of Prior Art

Conventional mobile storage facilities comprise a number of storage structures mounted on a floor track such that they can be moved together to form a block but such that an access aisle can be created between any pair of adjacent structures by moving selected structures along the track.

Many mobile storage facilities are provided with drive means in order to drive the storage structures along the track. In the past the drive means has usually been in the form of a cable drive, but more recently pneumatic and hydraulic rams have been provided for this purpose.

In one particular form of powered mobile storage facility the drive means is permanently connected to one of the end storage structures and this end structure is driven backward and forward to serve as a towing structure to which the other structures can be coupled and uncoupled by a series of latches. An aisle is created between any particular pair of storage structures by unlatching those two storage structures before the drive means is operated to move the end structure through a forward movement. The drive means is operated through a return stroke to close the storage structures onto one another before a new aisle space is to be created. With this arrangement the drive means must be capable of driving all of the storage structures at once when an aisle is to be created at the end remote from the drive means. The present invention provides an improved arrangement which greatly reduces the loading on the drive means for any given size of facility.

SUMMARY OF THE INVENTION

According to the invention there is provided a mobile storage facility comprising a plurality of storage structures arranged successively along a track and each movable along the track, power means connected between an intermediate pair of said storage structures and operable to cause relative movement between them, and coupling means selectively to couple the two end storage structures to fixed anchorages and selectively to couple together each successive pair of said storage structures which is not both the intermediate structures.

The power means may be an extensible fluid operated device. It may, for example, comprise a double acting hydraulic or pneumatic ram.

The said anchorages may be provided by a pair of fixed end structures between which the movable storage structures are disposed.

In order that the invention may be more fully explained, one particular embodiment thereof will now be described in some detail with reference to the accompanying drawing.

BRIEF DESCRIPTION OF DRAWING

The drawing is a diagrammatic plan of a mobile storage facility which comprises ten mobile storage structures numbered consecutively from 1 to 10. These structures will hereinafter be termed "mobiles."

DESCRIPTION OF THE PREFERRED EMBODIMENT

In the illustrated facility the mobiles 1 to 10 are arranged side by side to roll on wheels 12 along a floor track 11 extending between a pair of end walls 13, 14. They may be of conventional construction and may, for example, be open on both sides and be fitted with storage shelves.

A double acting pneumatic or hydraulic ram 15 is permanently connected between the intermediate pair of mobiles 5, 6. In the drawing the ram is shown disposed on the longitudinal center line of the facility and it may be mounted beneath or above the mobiles. However it could in fact be disposed in any convenient position. It could, for example, be disposed at the back of the facility. It is simply connected between the intermediate mobiles 5, 6 as a "floating" structure.

End walls 13, 14 which may be structural walls of a building in which the facility is installed, are spaced apart by a distance which is greater than the combined widths of the mobiles and when ram 15 is extended an aisle 16 is formed between two intermediate mobiles 5, 6.

Coupling means is provided to enable selective coupling of the end mobiles 1 and 10 to anchorages on the walls 13, 14 and selective coupling together of each successive pair of mobiles with the exception of the pair which is constituted by the intermediate mobiles 5, 6. The coupling means comprises a pair of latches 17, 18 to form the latch connections from the end mobiles 1 and 10 to the respective walls 13, 14 and eight latches numbered consecutively as 19 to 26 to provide the couplings between the mobiles. The latches are shown diagrammatically in the drawing. They may be of any suitable form and they may be remote controlled. For example they could be actuated by small, remotely controlled, pneumatic cylinder units.

The drawing shows the ram 15 in an extended position and with all the latches closed. If one of the latches is now released and the ram 15 retracted aisle 11 will close and an aisle will be created at a position determined by the released latch. For example, if latch 22 is released the ram will operate to draw only the intermediate mobile 5 to the right so that an aisle will be created between it and the adjacent mobile 4. On the other hand if latch 17 is released the five mobiles 1–5 will be drawn as a block to the right so as to create an aisle space between the mobile 1 and the end wall 13. If any of the latches 23–26 is released ram 15 will operate to draw one or more of the mobiles to the left to close the aisle space 16 and create a new aisle at the respective location.

It will be appreciated that whilst the illustrated facility has 10 storage mobiles, the greatest number of mobiles which the ram must be able to move is only five. Thus the ram can be of much lighter duty than if it were connected to an end mobile. Since the latches also take much less force, they can be of lighter construction and the reduction of the maximum inertia generated by moving mobiles alleviates control difficulties.

The illustrated construction has been advanced by way of example only and it could be varied considerably. For example, the number of storage mobiles could be increased or decreased. The mobiles need not necessarily be mounted between a pair of walls but could be disposed between a pair of fixed storage structures. It would also be possible to latch the end mobiles to anchorages on the floor instead of to end structures. It would also be possible to replace the ram with some other form of power means. For example, a continuous driving chain could be disposed beneath the intermediate mobiles 5, 6 with upper and lower spans. One mobile could be attached to the upper span and the other to the lower span so that the mobiles could be driven in opposite directions. The chain could be driven by a reversible electric motor. It is accordingly to be understood that the invention is in no way limited to any of the constructional details which have been advanced but includes many variations within the scope of the appended claims.

I claim:

1. A mobile storage facility comprising a plurality of storage structures arranged successively along a track and each movable along the track, power means connected between an intermediate pair of said storage structures and operable to cause relative movement between them, and coupling means for selectively coupling the two end storage structures to fixed anchorages and for selectively coupling together each successive pair of said storage structures other than both said intermediate structures.

2. A mobile storage facility as claimed in claim 1, wherein the coupling means comprises a pair of individual latches for the selective coupling of the two end structures to the fixed anchorages and further individual latches for the selective coupling together of said successive pairs of storage structures.

3. A mobile storage facility as claimed in claim 1, wherein said anchorages are provided by a pair of fixed end structures between which the movable storage structures are disposed.

4. A mobile storage facility as claimed in claim 1, wherein the power means is comprised of a fluid operated extensible device.

5. A mobile storage facility as claimed in claim 4, wherein the power means is a double acting hydraulic or pneumatic ram.

* * * * *